Oct. 31, 1950     J. B. GORDON     2,527,631
VARIABLE SPEED POWER TRANSMITTER
Filed Feb. 21, 1949     2 Sheets-Sheet 1
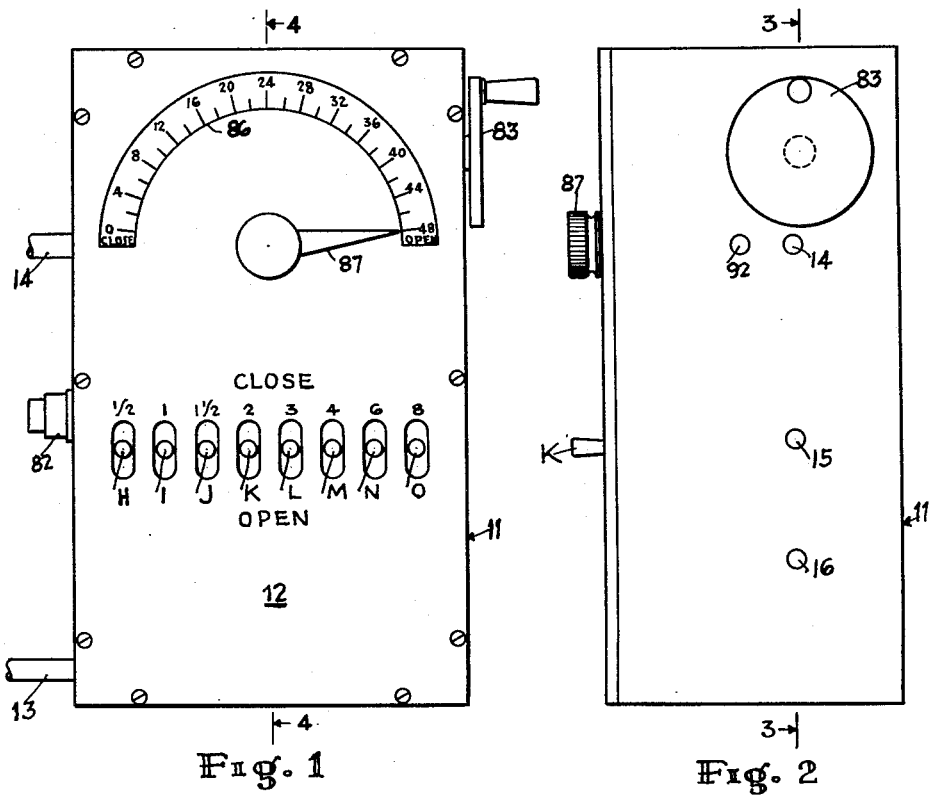
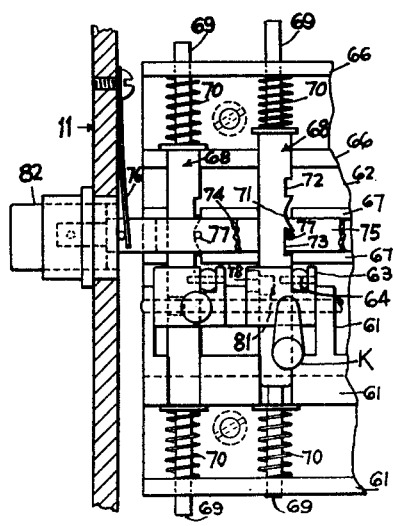
INVENTOR
James B. Gordon
BY
*Root L. Gunn*
ATTORNEY.

Oct. 31, 1950 J. B. GORDON 2,527,631
VARIABLE SPEED POWER TRANSMITTER
Filed Feb. 21, 1949 2 Sheets-Sheet 2

INVENTOR.
James B. Gordon
BY
ATTORNEY

Patented Oct. 31, 1950

2,527,631

UNITED STATES PATENT OFFICE 2,527,631

VARIABLE SPEED POWER TRANSMITTER

James Bennett Gordon, Los Angeles, Calif., assignor to Twentieth Century-Fox Film Corporation, Los Angeles, Calif., a corporation of New York Application February 21, 1949, Serial No. 77,608

9 Claims. (Cl. 74—29)

1

This invention relates to a variable speed power transmitter and deals particularly with a device which has been designed to provide a limited predetermined shaft rotation at various speeds.

Although the device has been designed primarily for use with a printer machine for printing various photographic effects on motion picture film, nevertheless it will be apparent that the same device can be used in any machine where a variable speed limited rotation of any particular shaft is required.

The invention to be described hereinafter is a small compact unit equipped with means for varying the ratio of speed between the input and output shaft, together with means for causing the output shaft to travel a limited rotational distance either backward or forward while the input shaft continually rotates in one direction.

Accordingly, it becomes the primary object of this invention to provide a variable speed power transmitter wherein the input shaft rotates continually and the output shaft may be rotated a fixed number of degrees of rotation at various speeds.

Another object of the invention is to provide means whereby various speeds of rotation of the output shaft may be selected at will.

Another object is to provide a novel means for preventing an operator from selecting more than one speed at a time, thus eliminating possible damage to the machine.

Still another object is to provide in a machine of the foregoing character means for visually indicating the amount of rotation and the speed of rotation of the output shaft.

Figures 3, 4:
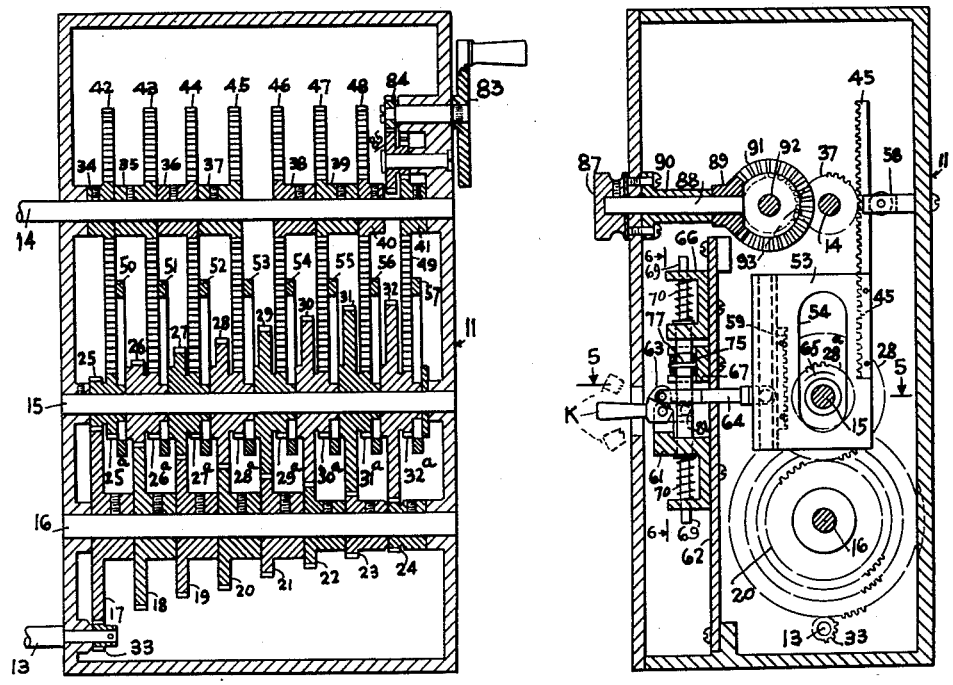
Figure 5:
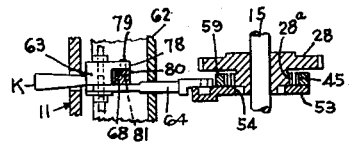

Other improvements, such as a manual means for operating the machine apart from the power means, together with an external means for resetting the machine for a new operation, will become apparent together with other objects and advantages which will be disclosed as the description proceeds in conjunction with the drawings in which:

Figure 1 is a front elevational view of the unit;
Figure 2 is a side elevation of the same;
Figure 3 is a sectional view on line 3—3 of Figure 2;
Figure 4 is a sectional view on line 4—4 of Figure 1;
Figure 5 is a fragmentary sectional view taken on line 5—5 of Figure 4; and
Figure 6 is an enlarged view taken on line 6—6 of Figure 4.

Briefly stated, the invention amounts to a small complete integrated unit consisting of a multiplicity of gears so arranged that by manipulation, various speeds may be obtained between the input and output shafts either backwards or forwards, together with a limited rotation of the output shaft. This limited rotation has been used in the motion picture industry to drive a shutter on a printing machine whereby the printing light in a printing machine may be so controlled that the scenes may be "faded out" or "faded in" as the occasion demands.

Referring to the drawings and particularly to Figure 1, it can be seen that my device comprises a case generally designated 11 covered by a face plate 12. Mounted within the case 11 is an input power shaft 13 and an output shaft 14. The invention embodies means for driving the output shaft from the input shaft together with means for varying the speeds between these two shafts. As shown in Figure 3 particularly, the means for this purpose comprises an intermediate shaft 15 which is fixed in the case 11 and a second intermediate shaft 16 which is rotatably mounted in the case 11.

Referring now to the construction shown in Figure 3, it will be observed that on the shaft 16 I have mounted a series of gears 17, 18, 19, 20, 21, 22, 23 and 24 which vary from a large diameter to a small diameter respectively. These gears are fixed to the shaft 16. On the shaft 15 it will be seen that meshing with the gears 17 to 24 are gears 25, 26, 27, 28, 29, 30, 31 and 32 respectively. The last mentioned gears are loosely mounted on the shaft 15 and carry spur gears 25a, 26a, 27a, 28a, 29a, 30a, 31a and 32a respectively attached thereto, said spur gears being of equal diameter. The gear 17 on the shaft 16 is driven by a smaller gear 33 which in turn is driven by the input shaft 13. It will be seen from the above that there is a variable speed ratio which varies from the gear train 17—25 to the gear train 24—32. It remains to transmit these variable speeds to the shaft 14.

The means for transmitting the variable speeds from the shaft 15 to shaft 14 consists of rack and pinion gears as follows: On shaft 14 it will be observed that I have mounted a series of gears 34, 35, 36, 37, 38, 39, 40 and 41. These gears are fixed to the shaft 14. In conjunction with the gears 34 to 41, I employ racks 42, 43, 44, 45, 46, 47, 48 and 49 respectively. On the lower end of racks 42 to 49 I fix plates 50, 51, 52, 53, 54, 55, 56 and 57 respectively.

In Figure 4, which is a sectional view on line 4—4 of Figure 1, it will be observed that the rack 45, which is typical of all the racks, is held in continual mesh with the gear 37 by means of a small roller bracket 58 suitably mounted upon the case 11. As before stated, the rack 45 carries on its lower end a plate 53 which is slotted as shown at 54 to straddle the shaft 15. The plate 53 also carries a rack 59 mounted opposite the rack 45. The purpose of these two opposed racks is to engage opposite sides of spur gear 28a which in turn is driven through the train of gears 20 and 28. Normally the racks 45 and 59 are held clear of the spur gear 28a which continually rotates so as to allow free rotation of the same. Means are provided for bringing rack 45 or rack 59 into engagement with the gear 28a so as to impart either backward or forward motion to the gear 37. The means provided for this purpose consists of a key K pivotally mounted on a bracket 61, which in turn is supported upon a plate 62 carried by the case 11. The key K carries a lug 63 to which is pivoted a link 64 that in turn is pivotally connected to the plate 53. With this arrangement the plate 53 may be moved in either direction with respect to the spur gear 28 so as to engage either the rack 45 or the rack 59 on opposite sides of the gear and still maintain contact of the rack 45 with the gear 37 at the upper end. It can thus be seen that the plate 53 can be moved either up or down according to which rack is engaged, which in turn imparts a rotary movement to the gear 37 that rotates the shaft 14 correspondingly. Since the speed of the shaft 14 with respect to the shaft 13 depends upon which gear train is engaged and since the gear trains are controlled by keys H, I, J, K, L, M, N and O respectively, all of which are identical with the above described key K, it becomes obvious that a variation of speeds may be obtained between the shafts 13 and 14. Moreover, it is an object of the invention to impart a partial rotation to the shaft 14. Accordingly, it will be observed that the rack 45 extends only part way along the plate 53 and the rack 59 is likewise shortened in an opposite direction. Therefore, if we assume that the spur gear 28a rotates in the direction of the arrow 65, it becomes obvious that if either rack is engaged with its respective side of the gear there will be a certain predetermined movement of the plate up or down, which ends as soon as the rack runs off the gear. Consequently, there will be only a limited rotation of the shaft 14 in the direction chosen, which depends entirely upon the number of teeth of the rack engaged by the spur gear before the rack runs off the gear. This amount of movement is predetermined and is built into the machine to meet the requirements of the degrees of rotation required on the shaft 14.

Since there is a possibility that one or more racks may be simultaneously engaged by manipulating more than one key at a time, I have provided a safeguard against this, which embodies a means whereby no key can be manipulated to bring into operation any train of gears without first releasing all other trains that might be engaged at that time. The means for this purpose is identical for all keys; therefore, a single means will be described. As shown in Figure 4, the plate 62 carries in addition to bracket 61 a top bracket 66 and an intermediate bracket 67. Slidably mounted in the brackets 61 and 66 are a series of rods 68. These rods may take a variety of forms but I have chosen to show them as being square in the central portion and as being turned down to round sections 69 on the ends.

The rods are mounted in the brackets 61 and 66 so that they are free to move longitudinally against springs 70 on either end of the pin. This provides a floating rod which is yieldably movable in either direction. As shown in Figure 6, one side of the rod is provided with a concave section 71 and notches 72 and 73 on each side of the concave section. Referring to Figure 4 it will be noted that the bracket 67 carries two bars 74 and 75 slidably mounted therein. The bars 74 and 75 are held in the position shown in Figure 6 by a spring finger 76 mounted on the case 11. Mounted in the bars 74 and 75 is a pin 77 which normally engages the side of the rod 68 and when the rod 68 is at rest with its respective key in a normal position the pin 77 rides in the concave portion 17 as shown in the left hand side of Figure 6. But when the rod 68 is either depressed or raised, as also shown in Figure 6, by depressing the key the pin 77 raises over the points of the concave section 71 and drops into the slot either 72 or 73 depending whether the rod 68 was raised or depressed. However, in passing over the points of the concave section the bars 74 and 75 were moved against the force of the spring 76, thereby releasing all or any of the pins which were in any of the slots of the other bars, thus allowing the rods 68 to assume their normal position under the urge of the spring 70. Under this arrangement there is no danger of setting two speeds at once and damaging the machine. The movement of the rods up and down by their respective keys is accomplished through a lug 78 formed on the key K. The lug 78 carries on its outer end a pin 79 fitted into a block 80. The block 80 in turn works in a notch 81 in the side of the rod 68. It thus becomes apparent that as the key K is rocked on its pivot point the lug 78 being eccentric works the rod 68 up or down depending upon the direction in which the key is moved. Once a key is operated, that particular rod remains set due to the fact that it is locked either in raised or depressed position by means of the pin 77 fitting into either of the slots 72 or 73. But before this has happened the pin 77, having ridden over the high points of the concave section 71, has moved the bars 74 and 75 and has released all other pins that may have been previously set, thereby leaving the device free for the new setting. As a means of optionally releasing any key that may have been set either accidentally or intentionally, I provide a push button 82 mounted on the exterior of the case 11 which may be manually operated to move the bars 74 and 75 longitudinally, the same as if they had been moved by the operation of the rod 69.

Since there might be a time when it was desirable to operate the entire device manually, I have provided a crank 83 rotatably mounted in the case 11 which is coupled to a gear 84 that in turn meshes with the gear 85 that drives the gear 41. Since the gear 41 is one of the gears fixed to the shaft 14, it will be seen that the shaft 14 can be rotated optionally and manually if desired.

Also, it is desirable that some means be provided whereby the actual position or the amount of the rotation of the shaft 14 may be indicated visually. For this purpose I have provided a dial 86 mounted on the face plate of the case 11. This dial may be calibrated as shown or in any other manner found convenient or desirable. A pointer 87 is mounted on a shaft 88 which carries on its inner end a miter gear 89. This whole assembly is carried on the case by means of a bracket 90. The gear 89 meshes with a gear 91 which is fixed to a shaft 92 rotatably mounted in the case 11. The shaft 92 in turn is driven by a spur gear 93 that meshes with any one of the spur gears 34 to 41. This arrangement will provide rotation of the dial 87 according to the rotation of the shaft 14, which will in turn give a visual indication of the position of the shaft, as well as the amount and speed of rotation at any time.

I claim:

1. In a variable speed power transmission a power output shaft having a plurality of gears fixed thereon, a plurality of gear trains each having a spur gear adapted to transmit power to said shaft at various speeds, means for selectively and separately connecting each of said trains of gears to said output shaft, said means including a pair of gear racks fixed together and associated with each gear train, said racks being diametrically opposed with respect to said spur gear of each train, one of said racks being arranged to continually mesh with one of said gears on said output shaft, and means for moving said pair of racks so that each of said racks may be respectively and alternately meshed with opposite sides of their respective spur gear to drive said output shaft in opposite directions depending upon which rack is engaged.

2. A variable speed power transmission comprising a power input shaft adapted to be continuously rotated in one direction, a plurality of drive gears of various pitch diameters fixed to said shaft, an intermediate shaft having a plurality of intermediate gears of respective complementary pitch diameters to said drive gears loosely mounted thereon and meshed with their respective drive gears, a spur gear fixed to each intermediate gear, a power output shaft having a plurality of output gears fixed thereon, and means for transmitting power from said spur gears to said output gears, said means including a pair of racks associated with each spur gear, each of said pair of racks being fixed together and arranged so that each rack of said pairs of racks may be alternately meshed with opposite sides of its respective spur gear, one of said racks of each pair being arranged to mesh with one of said output gears and drive the output shaft in opposite directions, depending upon which rack is engaged with its respective spur gear.

3. A variable speed power transmission comprising a power input shaft adapted to be continuously rotated in one direction, a plurality of drive gears of various pitch diameters fixed to said shaft, an intermediate shaft having a plurality of intermediate gears of respective complementary pitch diameters to said drive gears loosely mounted thereon and meshed with their respective drive gears, a spur gear fixed to each intermediate gear, a power output shaft having a plurality of output gears fixed thereon, and means for transmitting power from said spur gears to said output gears, said means including a pair of racks associated with each spur gear, each of said pairs of racks being fixed together and arranged so that each rack of said pairs of racks may be alternately meshed with opposite sides of its respective spur gear, one of said racks of each pair being arranged to mesh with one of said output gears and drive the output shaft in opposite directions, depending upon which rack is engaged with its respective spur gear, and means for moving said pairs of racks to optionally engage either rack of said pairs of racks with its respective spur gear.

4. A variable speed power transmission comprising a power input shaft adapted to be continuously rotated in one direction, a plurality of drive gears of various pitch diameters fixed to said shaft, an intermediate shaft having a plurality of intermediate gears of respective complementary pitch diameters to said drive gears loosely mounted thereon and meshed with their respective drive gears, a spur gear fixed to each intermediate gear, a power output shaft having a plurality of output gears fixed thereon, and means for transmitting power from said spur gears to said output gears, said means including a pair of racks associated with each spur gear, each of said pairs of racks being fixed together and arranged so that each rack of said pairs of racks may be alternately meshed with opposite sides of its respective spur gear, one of said racks of each pair being arranged to mesh with one of said output gears and drive the output shaft in opposite directions, depending upon which rack is engaged with its respective spur gear, and means for selectively moving a pair of said racks to optionally engage either rack of said pair of racks with its respective spur gear.

5. The elements of claim 4, wherein said last mentioned means includes a series of keys and levers operably connected to said racks respectively for moving said racks to bring each rack of said pairs of racks into and out of alternate engagement with their respective spur gears.

6. A variable speed power transmission comprising a power input shaft adapted to be continuously rotated in one direction, a plurality of drive gears of various pitch diameters fixed to said shaft, an intermediate shaft having a plurality of intermediate gears of respective complementary pitch diameters to said drive gears loosely mounted thereon and meshed with their respective drive gears, a spur gear fixed to each intermediate gear, a power output shaft having a plurality of output gears fixed thereon, and means for transmitting power from said spur gears to said output gears, said means including a pair of racks associated with each spur gear, each of said pairs of racks being fixed together and arranged so that each rack of said pairs of racks may be alternately meshed with opposite sides of its respective spur gear, one of said racks of each pair being arranged to mesh with one of said output gears and drive the output shaft in opposite directions, depending upon which rack is engaged with its respective spur gear, and means for selectively moving a pair of said racks to optionally engage either rack of said pair of racks with its respective spur gear, said last mentioned means including a series of keys and levers operably connected to said racks respectively for moving said racks to bring each rack of said pairs of racks into and out of alternate engagement with their respective spur gears, and means actuated by the operation of one of said keys for rendering all the other of said keys inoperative.

7. In a variable speed power transmission a power output shaft having a plurality of gears fixed thereon, a plurality of gear trains each having a spur gear adapted to transmit power to said shaft at various speeds, means for selectively and separately connecting each of said trains of gears to said output shaft, said means including a pair of gear racks fixed together and associated with each gear train, said racks being diametrically opposed with respect to said spur gear of each train, one of said racks being arranged to continually mesh with one of said gears on said output shaft, and means for moving said pair of racks so that each of said racks may be respectively and alternately meshed with opposite sides of their respective spur gear to drive said output shaft in opposite directions depending upon which rack is engaged, and visible means actuated by said output shaft for indicating the rotation of said shaft.

8. In a variable speed power transmission a power output shaft having a plurality of gears fixed thereon, a plurality of gear trains each having a spur gear adapted to transmit power to said shaft at various speeds, means for selectively and separately connecting each of said trains of gears to said output shaft, said means including a pair of gear racks fixed together and associated with each gear train, said racks being diametrically opposed with respect to said spur gear of each train, one of said racks being arranged to continually mesh with one of said gears on said output shaft, means for moving said pair of racks so that each of said racks may be respectively and alternately meshed with opposite sides of their respective spur gear to drive said output shaft in opposite directions depending upon which rack is engaged, and manual means for optionally rotating said output shaft to a desired position.

9. In a variable speed power transmission a power output shaft having a plurality of gears fixed thereon, a plurality of gear trains each having a spur gear adapted to transmit power to said shaft at various speeds, means for selectively and separately connecting each of said trains of gears to said output shaft, said means including a pair of gear racks fixed together and associated with each gear train, said racks being diametrically opposed with respect to said spur gear of each train, one of said racks being arranged to continually mesh with one of said gears on said output shaft, and means for moving said pair of racks so that each of said racks may be respectively and alternately meshed with opposite sides of their respective spur gear to drive said output shaft in opposite directions depending upon which rack is engaged, manual means for optionally rotating said output shaft to a desired position, and visible means actuated by said output shaft for indicating the position of said shaft.

JAMES BENNETT GORDON.

REFERENCES CITED

The following references are of record in the file of this patent:

UNITED STATES PATENTS

| Number | Name | Date |
|---|---|---|
| 953,929 | Stitchman | Apr. 5, 1910 |
| 2,246,671 | Fischer | June 24, 1941 |
| 2,368,804 | Chatelain | Feb. 6, 1945 |